United States Patent [19]

Takayama et al.

[11] Patent Number: 4,494,159

[45] Date of Patent: Jan. 15, 1985

[54] MAGNETIC HEAD-POSITIONING DEVICE FOR MAGNETIC DISC DRIVE

[75] Inventors: Chitoshi Takayama; Hideo Hirao; Hideya Yokouchi; Teruhiko Iida, all of Nagano, Japan

[73] Assignees: Kabushiki Kaisha Suwa Seikosha, Tokyo; Takaji Kogya Kabushiki Kaisha, Nagano, both of Japan

[21] Appl. No.: 432,885

[22] Filed: Oct. 5, 1982

[30] Foreign Application Priority Data

Oct. 9, 1981 [JP] Japan .................. 56-161583

[51] Int. Cl.³ ............................................. G11B 5/55
[52] U.S. Cl. .................................................. 360/78
[58] Field of Search ............... 360/77, 78; 318/611, 318/615, 620, 632, 638, 640, 647, 652, 686, 687

[56] References Cited

U.S. PATENT DOCUMENTS

| | | | |
|---|---|---|---|
| 3,699,555 | 10/1972 | Du Vall | 360/78 |
| 3,728,699 | 4/1973 | Sordello | 340/174.1 |
| 3,737,883 | 6/1973 | Sordello et al. | 360/78 |
| 3,906,326 | 9/1975 | Char | 318/594 |
| 4,125,882 | 11/1978 | Erickson, Sr. et al. | 360/78 |
| 4,138,728 | 2/1979 | Tung | 364/565 |
| 4,168,457 | 9/1979 | Rose | 318/561 |

OTHER PUBLICATIONS

IBM Technical Disclosure Bulletin, vol. 21, No. 5, Oct. '78, pp. 1792–1795, Offset Force Correction for Disk File, J. P. Mantey.

*Primary Examiner*—George G. Stellar
*Attorney, Agent, or Firm*—Blum, Kaplan, Friedman, Silberman & Beran

[57] ABSTRACT

In a magnetic head-positioning device using a coil motor, a position sensor detects the median position between one track and an adjacent track so as to decelerate and stop the moving head at the adjacent track. The magnetic head is transferred over a distance of many tracks by acceleration to the median positions and repeating the operation described above. A pair of flip-flops enables the magnetic head to move from one track to another one and a summing amplifier weights inputs from a position sensor, speed sensor and feed circuit to control motion of the voice coil motor.

17 Claims, 31 Drawing Figures

FIG.5
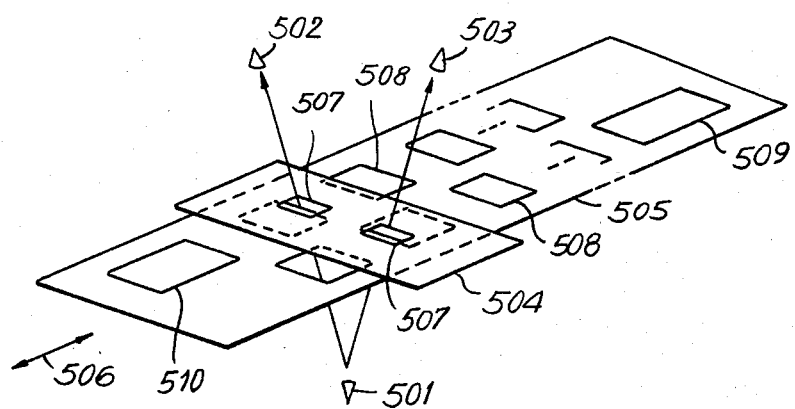
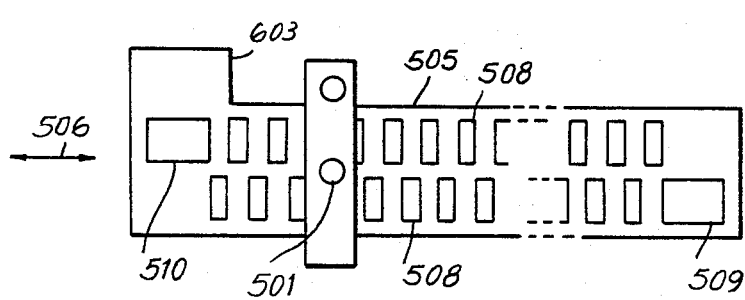
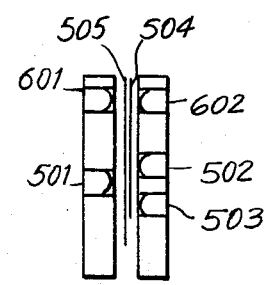
FIG.6a     FIG.6b

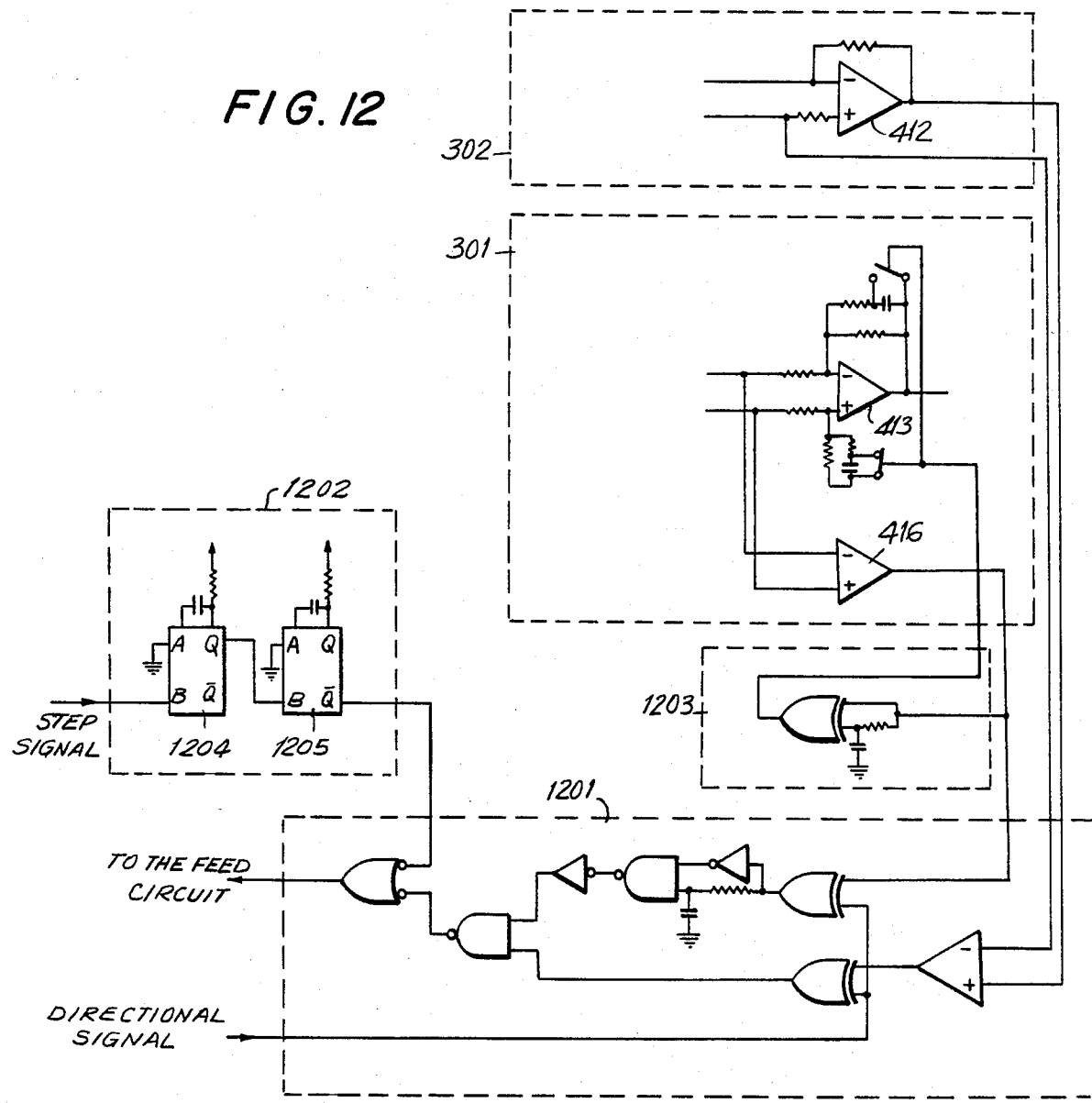

MAGNETIC HEAD-POSITIONING DEVICE FOR MAGNETIC DISC DRIVE

BACKGROUND OF THE INVENTION

A conventional magnetic head-positioning device using a voice coil has a disadvantage in that the control circuit for controlling the voice coil motor is very expensive. A voice coil motor generates a driving force operating on the same principles as a dynamic loudspeaker. That is, the presence of a current within a conductive material in a magnetic field induces a driving force in the conductive material. In general, in a conventional magnetic head-positioning device using a voice coil motor, the magnetic head detects a signal which is stored on the servo track giving information of position so that it is possible to determine the position. For transfer between one track and an adjacent track, the magnetic head is controlled by changing the control mode in the section to the desired track position. That is, a position sensor using a servo disk and a magnetic head detects only the track position. Next, a counter counts the number of tracks which the magnetic head passes on the way to the desired track position. The magnetic head is accelerated or slowed down in speed in accordance with the counted value.

Further, a pulse motor has also been used as a magnetic head-positioning device for a magnetic disc drive. However, a magnetic head-positioning device having a pulse motor also has the disadvantage of large size. For example, with reference to a minifloppy disc drive SA-400 as manufactured by the Shugart Company in the United States, the magnetic head is positioned by converting the turning motion of a step motor, having a diameter of approximately 55 mm and a height of approximately 25 mm, to a rectilinear force by means of a cam. Frequently, in the art, the magnetic head-positioning device for a mini-floppy disc drive uses a step motor having the size described above. The shape and size of a magnetic head-positioning device depends on the size of the step motor. Therefore, it is difficult to manufacture a magnetic head-positioning device with a step motor, and including a cam which is less than 30 mm in one dimension. Furthermore, precision of positioning the head is limited to ±20 microns. As a result, a magnetic head-positioning device with a step motor is disadvantageous for a small mini-floppy disc device and also for a rigid disc device with regard to cost.

What is needed is a magnetic head-positioning device for a magnetic disc drive which is low in cost, small in size and accurate in positioning the magnetic head relative to the disc.

SUMMARY OF THE INVENTION

Generally speaking, in accordance with the invention, a magnetic head-positioning device for a magnetic disc drive especially suitable for small size and low cost production is provided. In accordance with the invention, an inexpensive control circuit for controlling a voice coil motor is provided and a magnetic head-positioning device for a magnetic disc drive in accordance with this invention is described in detail hereinafter.

A position sensor detects the median position between one track and an adjacent track so as to stop the head at the desired track. In the situation where the magnetic head transfers from one track to another track, the magnetic head is forcibly moved close to the median position between the desired track and the adjacent track, and then the magnetic head moves on to the desired track. Also, when the magnetic head is to be transferred over a distance of many tracks, the magnetic head is moved to the desired position by repeating the operation described above. Namely, in a conventional control circuit for controlling a voice coil motor, the position of only the desired track is detected and the number of tracks through which the magnetic head passes is counted by a counter. Then, the magnetic head is controlled in speed in response to the counted value.

To the contrary, in a magnetic head-positioning device for a magnetic disc drive in accordance with this invention, the position sensor detects the median position between tracks. The magnetic head is forcibly accelerated close to the median position and decelerated by a speed feedback loop from the median position between the track adjacent to the desired track. Thereby, the magnetic head is moved from the adjacent track to the actually desired track. In the magnetic head-positioning device in accordance with this invention, an electric circuit, whose main components are a pair of flip-flops, enables the magnetic head to move from one track to another one. Thus, by using a flip-flop the control circuit for controlling the voice coil in accordance with this invention provides a substantial reduction in cost as compared to the conventional circuits.

Additionally, a magnetic head-positioning device in accordance with this invention is favorable as compared to a magnetic head-positioning device using a step motor. A magnetic head-positioning device for a magnetic disc drive which is less than 30 mm in height is provided. The precision of positioning is improved to the precision of the position sensor by having a high gain in the position detecting feedback loop. Where the position is optically detected by a detection plate with a slit which is produced by photoetching, the magnetic head is positioned with a precision of ±5 microns. This is the precision of the detection plate as a result of photoetching. In other words, in a magnetic head-positioning device for a magnetic disc device, variation in positioning caused by outside interference is reduced by making the gain high in a position feedback loop. As a result of this invention, a small voice coil motor comprising a coil and a magnetic circuit can be used in a magnetic head-positioning device. The magnetic head-positioning device is miniaturized as compared with the conventional magnetic head-positioning device with a step motor.

The magnetic head-positioning device of this invention is very advantageous for producing a magnetic disc drive of small size and low cost, and especially for a mini-floppy disc drive, a component which is increasingly applied to such devices as personal computers and gaging equipment. Magnetic mediums for data storage produced by many manufacturers operate with a fixed rate of rotation so that there is interchangeability of the products with one another. To start reading or writing information, it is necessary that the magnetic medium make a half rotation. Therefore, a reduction in time for transfer of the head between tracks does not, on the average, proportionately reduce access time. For a magnetic head-positioning device for a mini-floppy disc drive, a reduction in cost and miniaturization are more desired than a quick transfer of the head between tracks. On this basis, a magnetic head-positioning device in accordance with this invention provides a smaller and less expensive magnetic head-positioning device for a magnetic disc drive.

Accordingly, it is an object of this invention to provide an improved magnetic head-positioning device for magnetic disc drive which is reliable, small and low in cost to produce.

Another object of this invention is to provide an improved magnetic head-positioning device for a magnetic disc drive which stops the head on track with precision equal to the precision of manufacture of the position detector.

A further object of this invention is to provide an improved magnetic head-positioning device for magnetic disc drive which provides position stability when on track, and current overload protection under heavy load conditions of the head-positioning device.

A further object of this invention is to provide an improved magnetic head-positioning device for magnetic disc drive which prevents positional error due to variation of brightness of a light source or of sensitivity of light receiving elements in a position detector.

Still another object of this invention is to provide an improved magnetic head-positioning device for magnetic disc drive which eliminates problems of overshoot in moving from track to track.

Yet another object of this invention is to provide an improved magnetic head-positioning device for magnetic disc drive which uses a voice coil motor having a magnetic circuit adapted for uniform speed detection sensitivity over the entire range of motion.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a perspective view of slitted metal plates for position sensing in accordance with the invention;

FIGS. 6a, b show top and side views respectively of a position sensor in accordance with the invention;

FIG. 12 is a circuit diagram wherein a median position detector, timer circuit and capacitor short circuit are portions of a voice coil motor control circuit in accordance with the invention;

FIG. 14a is a schematic view of a voice coil motor in accordance with the invention, and FIGS. 14b, c, d illustrate examples of a magnetic circuit for use in the motor of FIG. 14a.

DESCRIPTION OF THE PREFERRED EMBODIMENTS

A conventional magnetic head-positioning device using a voice coil has a disadvantage in that the control circuit for controlling the voice coil motor is very expensive. A voice coil motor generates a driving force operating on the same principles as a dynamic loudspeaker. That is, the presence of a current within a conductive material in a magnetic field induces a driving force in the conductive material. In general, in a conventional magnetic head-positioning device using a voice coil motor, the magnetic head detects a signal which is stored on the servo track giving information of position so that it is possible to determine the position. For transfer between one track and an adjacent track, the magnetic head is controlled by changing the control mode in the section to the desired track position. That is, a position sensor using a servo disk and a magnetic head detects only the track position. Next, a counter counts the number of tracks which the magnetic head passes on the way to the desired track position. The magnetic head is accelerated or slowed down in speed in accordance with the counted value.

Figure 1:
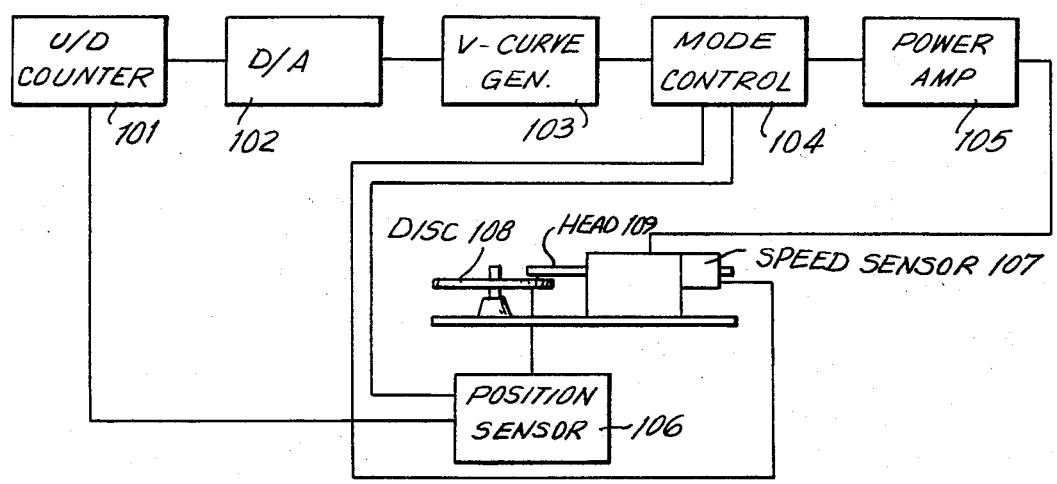
FIG. 1 is a schematic block diagram of a conventional circuit for a voice coil motor.

With reference to FIG. 1, a conventional circuit for controlling a voice coil motor includes an up/down counter 101, a digital-to-analog converter 102, a desired velocity curve generator 103 and circuits 104 for changing control modes. The circuit also includes power amplifier 105 of several stages for amplifying the feeble signal, several millivolts in level, read from the servo track. Each circuit requires more than several tens of integrated circuits, SSI or MSI, so that the cost of a conventional magnetic head-positioning device is high.

Further, a pulse motor has also been used as a magnetic head-positioning device for a magnetic disc drive. However, a magnetic head-positioning device having a pulse motor also has the disadvantage of large size. For example, with reference to a mini-floppy disc drive SA 400 as manufactured by the Shugart Company in the United States, the magnetic head is positioned by converting the turning motion of a step motor, having a diameter of approximately 55 mm and a height of approximately 25 mm, to a rectilinear force by means of a cam. Frequently, in the art, the magnetic head-positioning device for a mini-floppy disc drive uses a step motor having the size described above. The shape and size of a magnetic head-positioning device depends on the size of the step motor. Therefore, it is difficult to manufacture a magnetic head-positioning device with a step motor and including a cam which is less than 30 mm in one dimension. Furthermore, precision of positioning the head is limited to ±20 microns. As a result, a magnetic head-positioning device with a step motor is disadvantageous for a small mini-floppy disc device and also for a rigid disc device with regard to cost.

What is needed is a magnetic head-positioning device for a magnetic disc drive which is low in cost, small in size and accurate in positioning the magnetic head relative to the disc.

Generally speaking, in accordance with the invention, a magnetic head-positioning device for a magnetic disc drive especially suitable for small size and, low cost production is provided. In accordance with the invention, an inexpensive control circuit for controlling a voice coil motor is provided and a magnetic head-positioning device for a magnetic disc drive in accordance with this invention is described in detail hereinafter.

A position sensor detects the median position between one track and an adjacent track so as to stop the head at the desired track. In the situation where the magnetic head transfers from one track to another track, the magnetic head is forcibly moved close to the median position between the desired track and the adjacent track, and then the magnetic head moves on to the desired track. Also, when the magnetic head is to be transferred over a distance of many tracks, the magnetic head is moved to the desired position by repeating the operation described above. Namely, in a conventional control circuit for controlling a voice coil motor, the position of only the desired track is detected and the number of tracks through which the magnetic head passes is counted by a counter. Then, the magnetic head is controlled in speed in response to the counted value.

To the contrary, in a magnetic head-positioning device for a magnetic disc drive in accordance with this invention, the position sensor detects the median position between tracks. The magnetic head is forcibly accelerated close to the median position and decelerated by a speed feedback loop from the median position between the track adjacent to desired track. Thus, the magnetic head is moved from the adjacent track to the actually desired track. In the magnetic head-positioning device in accordance with this invention, an electric circuit, whose main components are a pair of flip-flops, enables the magnetic head to move from one track to another one. Thus, the control circuit for controlling the voice coil in accordance with this invention provides a subtantial reduction in cost as compared to the conventional circuits.

Additionally, a magnetic head-positioning device in accordance with this invention is favorable as compared to a magnetic head-positioning device using a step motor. A magnetic head-positioning device for a magnetic disc drive which is less than 30 mm in height is provided. The precision of positioning is improved to the precision of the position sensor by having a high gain in the position detecting feedback loop. Where the position is optically detected by a detection plate with a slit which is produced by photoetching, the magnetic head is positioned with a precision of ±5 microns. This is the precision of the detection plate as a result of photoetching. In other words, in a magnetic head-positioning device for a magnetic disc device, variation in positioning caused by outside interference is reduced by making the gain high in a position feedback loop. As a result of this invention, a small voice coil motor comprising a coil and a magnetic circuit can be used in a magnetic head-positioning device. The magnetic head-positioning device is miniaturized as compared with the conventional magnetic head-positioning device with a step motor.

The magnetic head-positioning device of this invention is very advantageous for producing a magnetic disc drive of small size and low cost, and especially for a mini-floppy disc drive, a component which is increasingly applied to such devices as personal computers and gaging equipment. Magnetic mediums for data storage produced by many manufacturers operate with a fixed rate of rotation so that there is interchangeability of the products with one another. To start reading or writing information, it is necessary that the magnetic medium make a half rotation. Therefore, a reduction in time for transfer of the head between tracks does not, on the average, proportionately reduce access time. For a magnetic head-positioning device for a mini-floppy disc drive, a reduction in cost and miniaturization are more desired than a quick transfer of the head between tracks. On this basis, a magnetic head-positioning device in accordance with this invention provides a smaller and less expensive magnetic head-positioning device for a magnetic disc drive.

Figure 2:
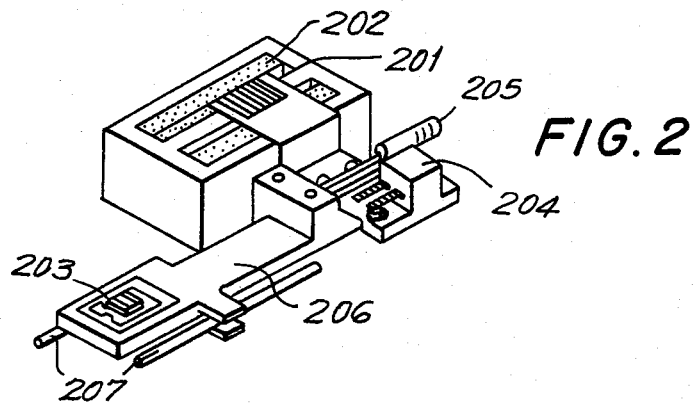
FIG. 2 is a perspective view of a magnetic head-positioning device for a magnetic disc drive in accordance with the invention.

In the magnetic head-positioning device for a magnetic disc drive in accordance with the invention, a voice coil motor is used as the electro-mechanical converter which advances rectilinearly in response to the force produced by a current bearing conductor in a magnetic field. Such a mechanical construction is in practical use in various known devices. FIG. 2 is a perspective view of a magnetic head-positioning device in accordance with this invention comprising a voice coil motor having a coil 201 and magnet 202. The coil 201 is disposed in the magnetic field produced by the magnet 202, and is connected to a head holder 206 whereon a magnetic head 203 is mounted. The holder 206 is movable forward and backward along the slides or axes 207 by the force generated in the coil 201. Thereby, the magnetic head 203 is transferred onto a track of a magnetic disc device (not shown in FIG. 2. A position sensor 204 and a speed sensor 205 detect the position and speed of the head holder, that is, the magnetic head, respectively. The magnetic head positioning device for magnetic disc drive in accordance with this invention positions the magnetic head by controlling the voice coil motor as shown in FIG. 2.

Figure 3:
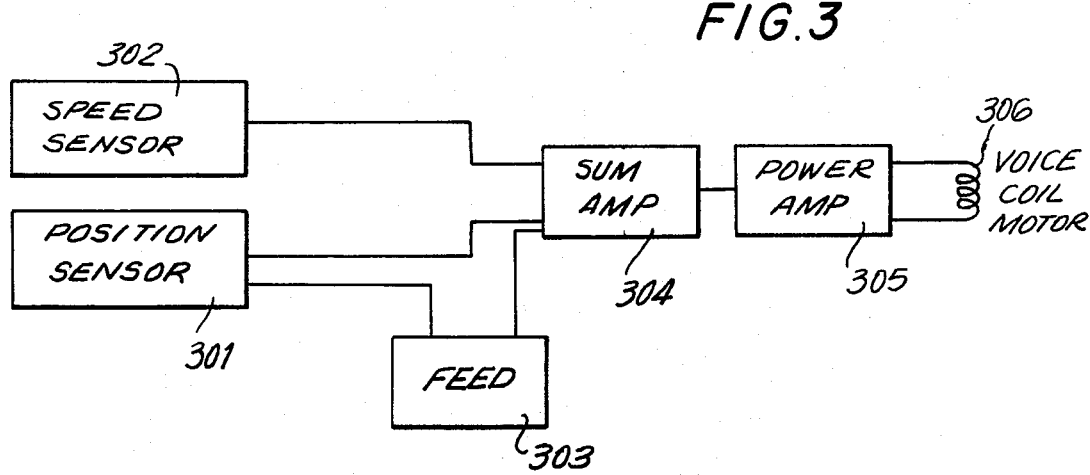
FIG. 3 is a functional block diagram of a magnetic head-positioning device for magnetic disc drive in accordance with the invention.
Figure 4:
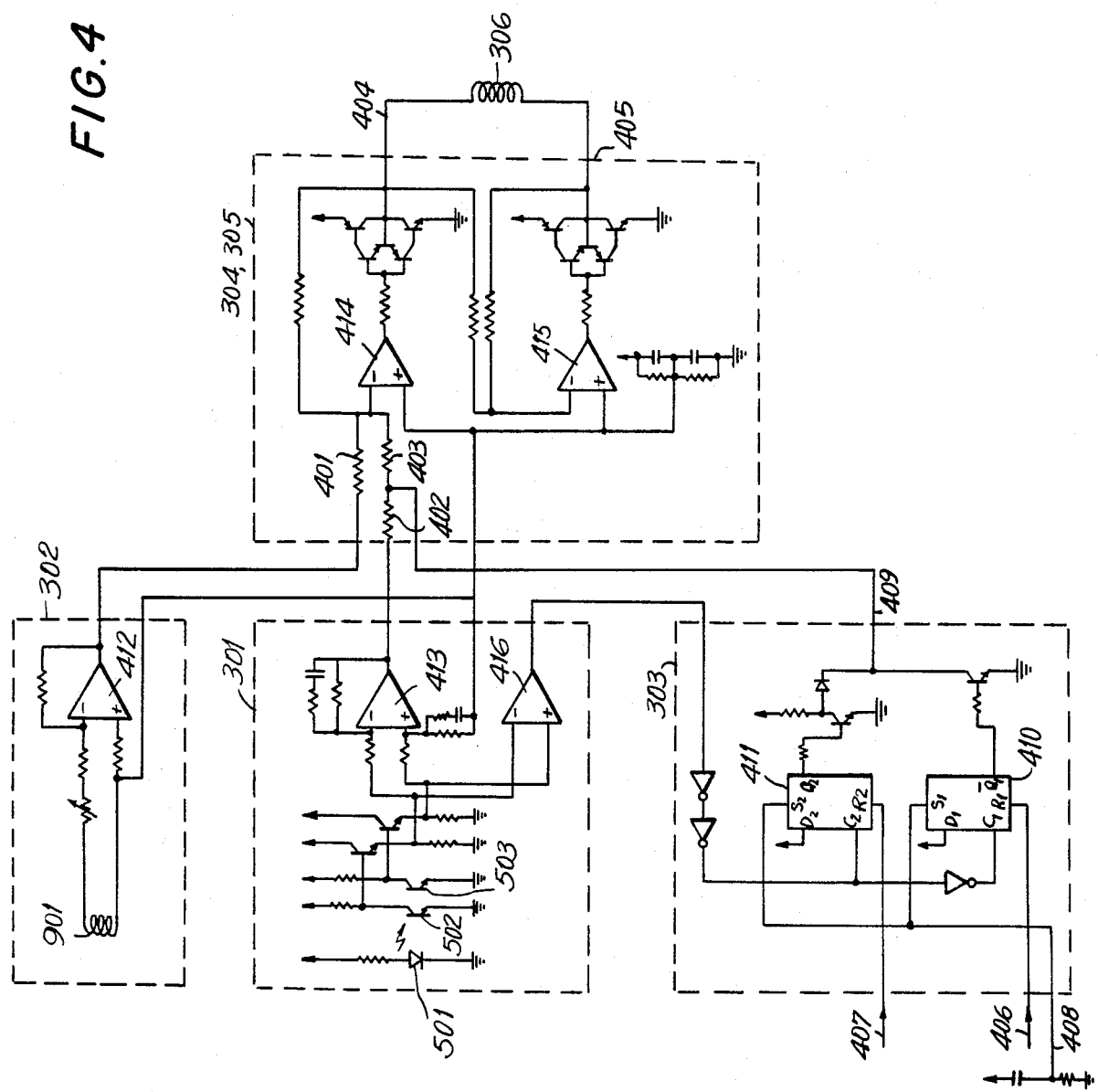
FIG. 4 is a circuit of a magnetic head-positioning device in accordance with the invention.

FIG. 3 is a functional block diagram and FIG. 4 is a circuit diagram of a magnetic head-positioning device in accordance with the invention. Outputs from a position sensor 301, speed sensor 302 and feed circuit 303 are summed by a summing amplifier 304, and are subsequently amplified by a power amplifier 305 to provide a signal for a voice coil motor 306. A plate for detecting the position of the position sensor and a speed sensing coil of the speed sensor are mounted on a moving portion of the voice coil motor. Therefore, a position control feedback loop includes a position sensor, summing amplifier, power amplifier, and a voice coil motor. Similarly, the speed feedback loop includes a speed sensor, summing amplifier, power amplifier, and the voice coil motor.

In FIG. 4 portions are outlined with broken lines to indicate those functions which correspond with FIG. 3. In FIG. 4, however, the summing amplifier 304 and power amplifier 305 are not definitely separated although such a circuit structure is also possible. The circuit includes resistances 401–403, input terminals 406–408 and output terminal 409 of the feed circuit, and D-type flip-flops 410, 411 with set-reset capability.

FIG. 5 shows a metal plate with slits for sensing a position. Light emitted from a luminescent element, a light emitting diode 501, arrives at receiving light elements, photo transistors 502, 503. A moving plate 505 with slits, which is connected with the magnetic head carriage 206, moves in the directions as shown by an arrow 506.

Figure 7A:
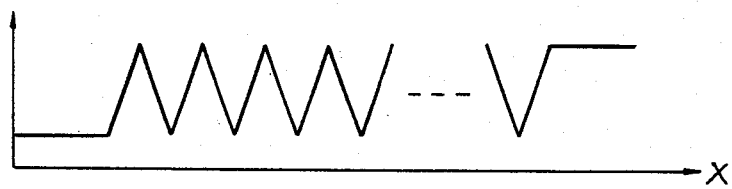
FIGS. 7a, b are waveforms of outputs of photo-transistors of FIGS. 6a, b.

As shown in FIG. 6, the moving plate 505 is provided with slits for transmitting light in two rows between which there is a 180° phase shift. On account of the 180° out-of-phase relationship, outputs from photo transistors 502, 503 represent waveforms as shown in FIGS. 7a, b, respectively, against variations of position x of the moving plate 505 with slits. As shown in FIGS. 7a, b, the waveforms are 180° out-of-phase against the variation of position x. The output from a position sensor presents the waveform as shown in FIG. 7c by amplifying the outputs from the transistors as shown in FIGS. 7a, b by means of a differential amplifier.

Figure 7B:
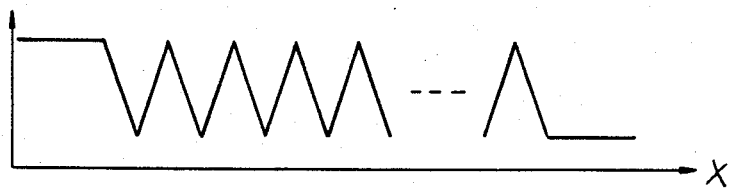
FIG. 7c is a waveform of the output of a position sensor in accordance with the invention.
Figure 7C:
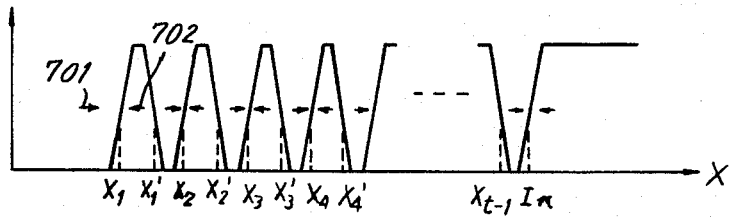

According to the supply voltage and the amplifying levels of the position sensor, the output from the position sensor is saturated as shown in FIG. 7(c). The voice coil motor is driven by a signal outputted from the position sensor through a summing amplfiier and a power amplifier. In FIG. 7(c), provided that the direction to the center of rotation of a magnetic disc drive is "forward" and the opposite direction is "backward", a voice coil motor goes forward as shown by an arrow 701 when the output from the position sensor is at low level. The direction "backward" is shown by an arrow 702. As for a position controlling feedback loop consisting of a position sensor, summing amplifier and voice coil motor, each of the positions x1, x2, . . . xn (n is the total number of tracks) in FIG. 7(c), indicates a position where the voice coil motor is stopped. The positions indicated by x'1, x'2, . . . x'n are the median positions between tracks. In the present specification, the "adjacent track positions" means the track positions which adjoin each other such as x1 and x2, or x2 and x3. The magnetic head is controlled to be transferred and stopped at the nearest track position to the median position between adjacent tracks. That is, the magnetic head is controlled to stop at the position where the outputs from the two photo-transistors coincide in level.

Figure 8:
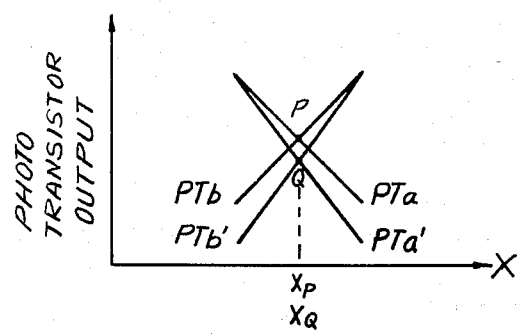
FIG. 8 is a graphical representation of the effects of different parameters on photo-transistor output in the detector of FIGS. 6a, b.

An object of the invention is to prevent the occurrence of positional error caused by variation of the brightness of the luminescent element and the receiving photo-sensitivity of the light-receiving elements. This is achieved by receiving the light emitted from only one luminescent element by means of two light-receiving elements through a detection plate. In FIG. 8, the outputs PTa and PTb from the two photo-transistors intersect in a point P. Therefore, the position xP is a track position where the voice coil motor is stopped. That is, the position xP corresponds to one of x1, x2, . . . xn of FIG. 7. If the light density emitted from the light emitting diode is increased by a change of the supply voltage due to temperature characteristics, and so on, or the photo-sensitivities of the two photo-transistors become high on account of temperature characteristics, or the like, the output PTa from the photo transistor changes to PTa', and the output PTb changes to PTb'. Consequently, the intersecting point where the outputs from the two photo transistors coincide changes from P to Q. Nevertheless, the positions xP and xQ respectively, corresponding to the intersecting points P and Q are not changed. In the present invention, therefore, positional error does not occur due to the variation of the brightness of the light-emitting element and the photo-sensitivity of the light-receiving elements.

In FIG. 5, a slit 507 of a stable plate 504 is smaller than a slit 508 of the moving plate 505. The result is that the brightness passed through the slits of the plates 504 and 505 is determined by the mechanical accuracy of a perpendicular side of the slit in the direction in which the plate 505 transfers as indicated by the arrow 506. A variation in this direction perpendicular to the direction in which a plate 505 transfers does not affect the brightness of the light passed through slits. Namely, a magnetic head-positioning device according to this invention is effective in that variation in the side perpendicular to the direction in which the movable plate transfers at the time of, or after mounting, does not affect the positioning accuracy. It may as well make a stable plate 504 and a mounting of a photo-transistor or a light-emitting diode in a body.

As shown in FIGS. 5 and 6, only two slits 509 and 510 which are disposed near the longitudinal ends of the movable plate 505 are larger in the moving directions 506 than the other slits 508. This provides large zones where the voice coil motor is not stopped other than at x1 and xn in FIG. 7. The voice coil motor is prevented from stopping at an unsuitable position by providing a stopper mechanically in the zone where the magnetic head is not stopped electrically. That is to say, a zone in which the last stopper of a voice coil motor is provided is extremely expanded by making the two slits nearest the edge of movable plate larger than the other slits in the transferring direction.

Thus, the present invention permits a reduction in cost for manufacturing a magnetic disc drive. The movable plate 505 is produced from a thin metal plate using a photolithographic process or a pressing process. Such methods for manufacturing a plate for detection bring about a reduction in cost and a shortening of the space between a light-emitting element and a light-receiving element. On a floppy disc drive, a standard track pitch is 529 μm. The interval between x1 and x2 is 529 μm in FIG. 7 and consequently the width of a slit 508 of a movable plate is 265 μm in FIGS. 5 and 6.

The light emitted from the luminescent element gets to a light receiving element through a slit of so narrow a width of about 265 μm. On the other hand, the brightness of the emitting light is gradually decreased because of the energization of the light-emitting diode. To decrease the current energizing in a light-emitting diode provides a longer diode life. However, the reduction in current which flows in a light-emitting diode justly indicates the decrease in brightness of the emitting light. Also, it becomes slow to respond as making the sensitivity of a photo-transistor high. Under these conditions, it is difficult for the output voltage to be large at the position of a photo-transistor.

What is most able to eliminate the above mentioned disadvantages is to narrow the space between the light-emitting diode and a photo-transistor. This is achieved by means of the metallic plate for detection which can be produced to be some ten μm in thickness.

If a slitted plate whose thickness is some ten μm is made of glass, this glass plate is easily broken by a slight stress. Though a glass plate is widely used, it is not suitable for such a position sensor as in an embodiment of this invention. On the other hand, a metallic plate with slits according to this invention is neither broken nor bent because it moves in a small space along the gap.

Furthermore, a position sensor according to the present invention requires no adjustment for a standard track detector by making a position sensing plate and a standard track detecting plate in a unitary body.

A standard track is standardized for a track-seek operation in a magnetic disc device. A track on the most outer periphery is usually considered as a standard track, and it is 00 track with reference to a floppy disc device. That is, a floppy disc device is provided with a 00 track detector. And a 00 track detector is adjusted in position at the position of the 00 track so as to detect the 00 track. In FIG. 6, a 00 track is detected by a light-emitting diode 601, a photo-transistor 602 and a slit plate 603. The plate with slit 603 is united with a position sensing plate with slits 505 in a unitary body. The position sensing plate with slits (FIG. 6) not only determines track position, but detects the 00 track. Accordingly, there is no necessity for adjusting the position of a 00 track detector, which provides an extreme reduction in cost.

Figure 9:
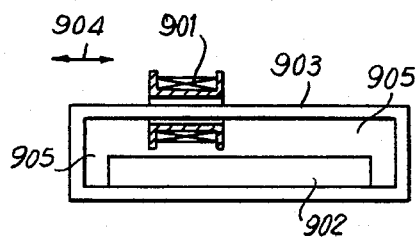
FIG. 9 illustrates the construction of a speed sensor in accordance with the invention.
Figure 10A:
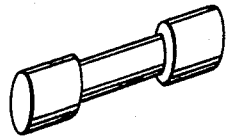
FIGS. 10a, b show examples of components for use within the coil and magnetic circuit of FIG. 9.
Figure 10B:
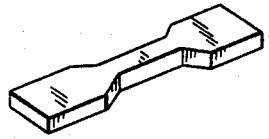

Next, the speed sensor and speed feedback loop are explained. The conductive material moving in the magnetic field has induced an electromotive force which is proportional to speed. The speed sensor output is obtained by amplifying the above-mentioned electromotive force. FIG. 9 shows an example of a speed sensor which is composed of a speed sensitive coil 901, a magnet 902 and a magnetic circuit 903. The speed sensitive coil 901 is transferred in the directions of the arrow 904 together with the voice coil motor, and produces the electromotive force which is proportional to speed.

The above-mentioned speed sensor is shown as only an example. For example, a construction wherein the speed sensitive coil is fixed, and the magnet, or the magnet and the magnetic circuit move is also practically used.

In the speed sensor shown in FIG. 9, the magnetic flux concentration of the gap portions 905 at the ends of the magnet is lower than that in the center of the magnet. Thus, the sensitivity to speed decreases at both ends of the magnet.

In a conventional speed sensor, uniform sensitivity to speed is obtained by making the magnet longer and by moving the speed sensitive coil within a region which has uniform magnetic flux concentration in the gap. However, this method has such shortcomings that a large size magnet is needed and the speed sensor increases in dimension.

On the other hand, the speed sensor in accordance with the present invention has a uniform magnetic flux concentration in the gap and uniform sensitivity to speed at both ends of the magnet. Such a speed sensor is obtained by forming the magnetic circuit 903 inside the speed sensitive coil shown in FIG. 9 in a manner such that cross-sectional area is larger at both ends in the transverse direction with respect to the moving direction 904 of the speed sensitive coil shown in FIG. 9. In addition, sensitivity distribution to the desired speed can also be obtained. When the voice coil motor moves on the track and the inductance of the coil at both ends is relatively high, it sometimes passes through a target position because of a delay of speed reduction. That is, "overshoot" is produced. In accordance with the present invention, overshoot is eliminated by controlling the maximum speed with the above-mentioned magnetic circuit wherein the magnetic flux concentration is higher and the speed feedback is stronger at both ends. The target speed in the speed feedback loop is 0, that is, viscous resistance is produced toward the move of the voice coil motor.

The speed feedback loop has two objects. One of them is to achieve stability of the voice coil motor in the stop position. It is well known to achieve stability by providing a speed feedback loop in addition to the position controlling feedback loop, so a detailed explanation is omitted here. The speed feedback loop in a magnetic head-positioning device for magnetic disc drive in accordance with the present invention has another object as follows. The objects is to reduce the speed from the median position between adjacent tracks to the adjacent track at the time of moving on track. As stated above, the voice coil motor moves to the nearest track position from the median position between adjacent tracks by means of the position control loop. At the time of moving on tracks, the voice coil motor, which is accelerated to the median position between adjacent tracks, is decelerated as needed at positions up to the next median position between adjacent tracks in the moving direction. As illustrated in FIG. 7, at the time of moving from track $X_1$ to track $X_2$, the voice coil motor can be decelerated from the median position $X_1'$ between adjacent tracks to the next adjacent track position $X_2'$ in the moving direction. Thus, in the magnetic head-positioning device for magnetic disc drive in accordance with the present invention, the speed feedback loop has open loop gain by which the speed can be reduced with the above-mentioned position. When the position sensor output or the speed sensor output is saturated, the summing amplifier has the function for weighted-summing in order to provide the greater weight to the speed sensor output. In FIG. 7, at the time of moving from $X_1$ to $X_2$, the position control loop has the function of accelerating the voice coil motor from $X_1'$ to $X_2$. On the other hand, the speed control loop has the function for always decelerating the voice coil motor. At the time of moving on tracks, if the voice coil motor is not decelerated enough from $X_1'$ to $X_2$, it raises a possible problem that the voice coil motor moves to $X_3$. Accordingly, the magnetic head-positioning device for magnetic disc drive in accordance with the present invention has speed feedback, making is possible, to decelerate enough from $X_1'$ to $X_2$, or the sum amplifier for providing the greater weight to the speed sensor output than that to the position sensor output.

Next, the feed circuit and movements on tracks are explained. The feed circuit has the function for moving the magnetic head to the adjacent track position. An example of a feed circuit is shown at 303 of FIG. 4.

Figure 11A:
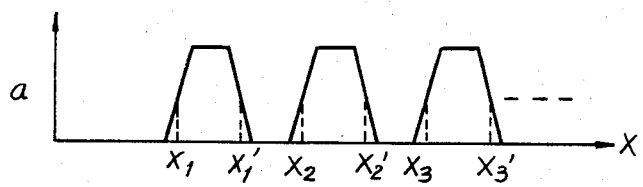
FIG. 11, consisting of a–g, illustrates waveforms at respective portions of the magnetic head-positioning device for magnetic disc drive in accordance with the invention relative to position of the head.
Figure 11B:
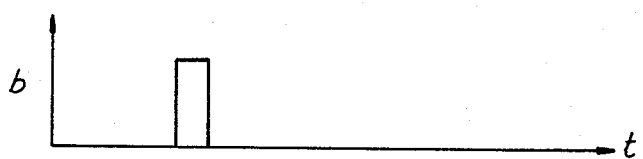
Figure 11C:
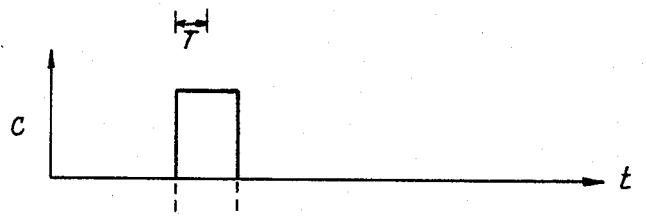

Operation of the feed circuit is explained with reference also to FIG. 11. In FIG. 11, graph a shows change of the position sensor output versus change of position. That is, FIG. 11a shows the same information as FIG. 7c. In FIG. 11a, the positions $X_1$, $X_2$ and $X_3$ are stop positions, namely, track position points on the magnetic disc, and the positions $X_1'$, $X_2'$ and $X_3'$ are median points between adjacent tracks. When the magnetic head is transferred in the direction wherein the value of X increases, the position sensor output alternately and repeatedly is increased and decreased. In this case, the position sensor output is increasing in the neighborhood of the track position and is decreasing in the neighborhood of the median point between adjacent tracks.

On the other hand, when the magnetic head is transferred in the direction wherein the value of X decreases, the position sensor output is increased in the neighborhood of the median point between adjacent tracks and is decreased in the neighborhood of the track position. This is opposite to the above-mentioned case. That is, when the moving direction of magnetic head is known, the median position between adjacent tracks and the adjacent track position can be discriminated in FIG. 11a showing the position sensor output. The voice coil motor is compulsorily driven to the median point between adjacent tracks by using the above-mentioned discrimination method in the feed circuit, and thus, the magnetic head is transferred to the adjacent track.

In FIG. 4, D-type flip-flops 410, 411 have set-reset capability and change on a rise of the clock input. When the magnetic heads stops, the flip-flops 410, 411 are set in the state of turning on the power by the input terminal 408, and the output 409 of the feed circuit is in a floating state.

A case where the magnetic head is transferred forward by one track is explained using an example of being transferred from $X_1$ to $X_2$ in FIG. 11. A reset pulse b of FIG. 11 is inputted to the flip-flop 410 from the input terminal 406 shown in FIG. 4. The flip-flop 410 is reset, and $Q_1$ goes to a High-level. The output from $Q_1$ is shown in FIG. 11c. When the transistor with its gate connected to $\overline{Q}$ is ON, the feed circuit output 409 comes to a Low-level and a signal for transferring the voice coil motor forward (in the direction toward $X_2$) is outputted. When the voice coil motor is transferred forward and reaches the median point between adjacent tracks, which is $X_1'$ shown in FIG. 11a, a position comparator 416 within the position sensor changes state. Thus, $Q_1$ from the flip-flop 410 comes to the Low-level, being clocked by the output of the comparator 416, and the output from the feed circuit is in the floating condition again. That is, the feed circuit outputs a signal by which the voice coil motor is compulsorily transferred to the median point between adjacent tracks. Above, the case where the voice coil motor is transferred in the forward direction was explained as an example. In case of transfer in the backward direction, quite the same operation is accomplished by means of a flip-flop 411.

In summarizing, the above described circuitry provides a regulation system for the magnetic head which performs properly to bring the head to the desired track under three very probable conditions. Namely, as stated above, the head is accelerated from its position on the first track $X_1$ to the median point $X_1'$ and thereafter it is decelerated as required to bring the head to rest over the next, that is, the adjacent track $X_2$. In the process of deceleration the head may stop in any of three positions. Namely, the head in being decelerated may first stop in the region between $X_1'$ and $X_2$, that is, it is short of its target position. The control system will then bring the head to the position $X_2$ with further accelerations and decelerations as neccessary.

Secondly, in being decelerated from the median position $X_1'$, the head may stop for the first time right on the target track position $X_2$. No further operation is required. However, in a third condition the head may stop beyond the target track $X_2$, that is, the head may first stop between $X_2$ and the next median position $X_2'$. In such a case the circuits will provide a deceleration signal, that is, a reverse signal, which will bring the head back to the target track $X_2$, recognizing that this may require several accelerations and decelerations.

In the undershoot condition, the head is accelerated again by the position feedback loop and reaches the target target track position and stops. In the overshoot case where the head passes through the target track position, and does not pass through the next median position $X_2'$, the head is accelerated in the return direction by the position feedback loop and reaches the target track position $X_2$ and stops there. Thus, as stated above, when head speed becomes zero for the first time between the median position $X_1'$ and the next median position $X_2'$ through deceleration, the head reaches the target track position $X_2$ and finally stops there because the position feedback loop is always operating between the two median positions $X_1'$ and $X_2'$. The term deceleration is used herein, therefore, to refer to the entire process of bringing the head to rest at the target track position after initial acceleration from the first track position $X_1$ to the next median position $X_1'$.

In FIG. 4, flip-flops with set-reset capability are used in the feed circuit 303. This prevents the flip-flop from inverting before the voice coil motor starts moving by keeping the time width T of the reset pulse provided to the flip-flops 410, 411 (FIG. 11b) wide to a certain extent in case the voice coil motor is vibrating slightly because of a disturbance, and so forth, in the track position, namely, the balanced point of the position control loop.

In the presented example, the track position and the median position between tracks are discriminated by the flip-flop of the feed circuit. However, it is possible to have the above-mentioned discrimination function within the position sensor by providing a logical circuit for discriminating within the position sensor. The logical circuit in the position sensor can be obtained in the same way of thinking as the feed circuit, which is explained above, so its explanation is omitted here.

Figure 11D:
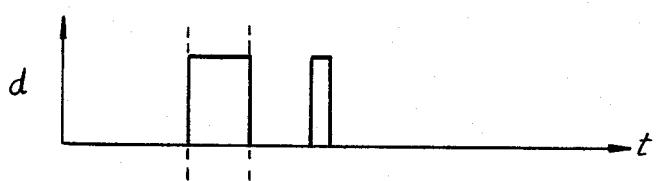
Figure 11E:
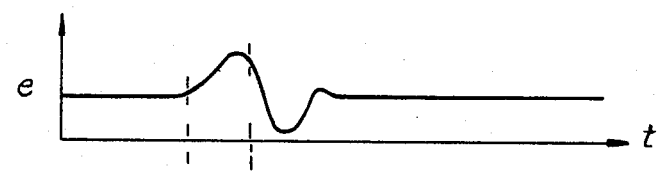
Figure 11F:
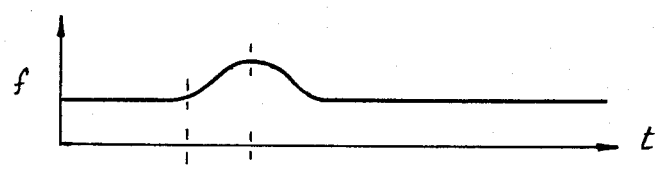

As stated above, a signal from the feed circuit for accelerating the voice coil motor to the median position between adjacent tracks is outputted. In the magnetic head-positioning device for magnetic disc drive in accordance with the present invention, the voice coil motor is transferred between tracks by properly setting the weight of each input to the summing amplifier for weighted-summing each output in addition to each level of outputs from the feed circuit, the speed sensor and the position sensor, and by accelerating or decelerating the voice coil motor. FIGS. 11b through g illustrate waveforms in each position when the voice coil motor is transferred from $X_1$ to $X_2$. A signal for accelerating the voice coil motor from $X_1$ to $X_1'$ is outputted from the feed circuit in response to step pulse b. Output from the feed circuit, whose level is large, has the largest weight in the summing amplifier. Resistance 403 is smaller than resistance 401 in FIG. 4, thus, the voice coil motor is accelerated in the direction toward $X_2$. When the voice coil motor reaches $X_1'$, output from the feed circuit is put in the floating condition and the voice coil motor is decelerated in response to output from the speed sensor shown in FIG. 11f. As explained above, the voice coil motor is set in open loop gain of deceleratable speed feedback, and resistances are set in the state of (resistance 403 + resistance 402) > resistance 401. As a result, acceleration or deceleration of the voice coil motor is controlled. FIG. 11d illustrates the output from the position comparator 416. FIG. 11e illustrates the output from the position sensor.

Figure 11G:
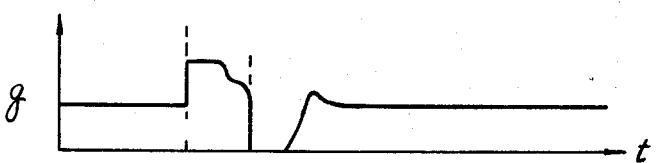

Moveover, voltage for acceleration can be reduced to a certain extent and maximum speed can be controlled in the neighborhood of the median position by properly setting the ratio of resistance 403 to resistance 401 as shown in drive waveform of FIG. 11g, which is the waveform at the voice coil motor terminal 404 (FIG. 4). That is, a range where the voice coil motor is transferred at almost constant speed in the neighborhood of the median position can be available by selecting resistance values.

This has the advantages of removing malfunction at the time of moving on track, and of ensuring the movement on track against mechanical disturbance as follows. That is, it is probable that the voice coil motor passes over to the next track from the target track position, i.e., in the previous example, from position $X_2$ to $X_3$, because of delay of current inversion responsive to the inductance of the coil, namely, because of delay of deceleration. In this case, initial speed of deceleration movement is reduced and speed can be certainly reduced to 0 before reaching the neighborhood of $X_2$ by lowering acceleration voltage and controlling the maximum speed in the previous region of median position, as explained above. Thus, malfunction at the time of moving on track is removed. Moreover, the above-mentioned movements mean that the voice coil motor is controlled with respect to its speed at the time of passing through the median position between adjacent tracks (namely, the maximum speed) by feedback with the output signal from the speed sensor. Therefore, in case the voice coil motor does not speed up fully in the acceleration region because of an increase in friction load, and so forth, the maximum voltage is automatically applied to the voice coil motor until reaching the median position between adjacent tracks. On the other hand, in the opposite case, of low friction, the voltage signal applied to the voice coil motor is limited. That is, movement of the voice coil motor on track is further ensured against mechanical disturbance.

Figure 15A:
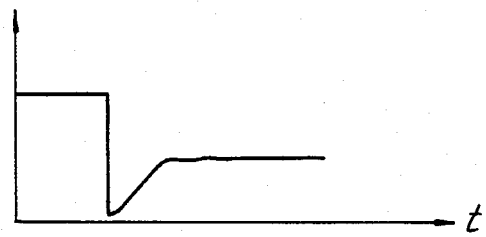
FIGS. 15a, b, c illustrate examples of experimentally measured voice coil motor driving waveforms under varying conditions.
Figure 15B:
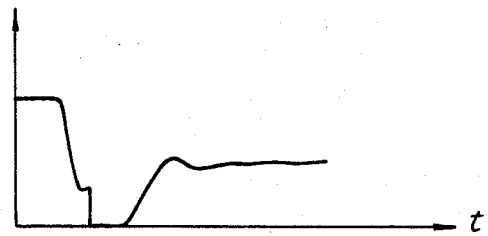
Figure 15C:
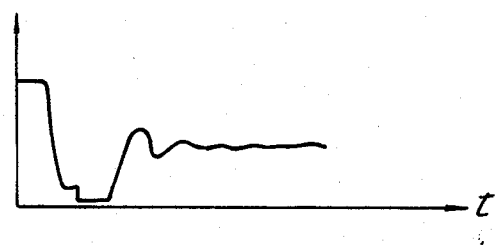

FIG. 15 illustrates an example of experimental results with respect to the voice coil motor drive waveform in order to concretely explain the above-mentioned concepts. FIG. 15a shows the waveform in a case where the load on the voice coil motor is heavier than the force generated from the voice coil motor. The maximum voltage is continuously applied in the acceleration region, since the voice coil motor does not speed up fully. FIG. 15b shows the drive waveform in the normal condition. FIG. 15c shows the waveform when the supply voltage is raised above normal. In this case, the applied voltage in the acceleration region is more limited in time, since the force generated from the voice coil motor increases and speed goes up.

Next, a median position detector is explained. The median position detector exactly detects that the voice coil motor is passing over the median position between adjacent tracks by means of the position detector output and the speed detector output. As previously explained, in the magnetic head-positioning device in accordance with the present invention, the voice coil motor is accelerated to the median position between adjacent tracks, and is decelerated from there. Therefore, error in detecting the median position causes a possibility of hunting or seek error. The median position detector in accordance with the present invention detects that the voice coil motor passes over the median position by three conditions, namely, an instruction direction on the tracks, the change direction of the position sensor output, and the output polarity of the speed sensor, or by any of these conditions, and outputs to the feed circuit.

The schematic diagram of FIG. 12 shows an example of a median position detector 1201. The median position detector is placed between the position sensor 301 and the feed circuit 303 shown in FIG. 4, which is considered together with FIG. 12, hereafter. Logical signal movements within the median position detector shown in FIG. 12 are simple, so that a detailed explanation is eliminated here. In short, only when three outputs are proper, namely, the level input outputted from the magnetic disc drive control circuit side indicating the direction of step movements, polarity of the speed sensor output indicating the direction in which the voice coil motor actually moves, and the direction to which output of the position sensor (which is the position comparator 416 in FIG. 12). The median position detector detects that the voice coil motor passes over the median position between adjacent tracks in the moving direction, and outputs a narrow pulse to the feed circuit in order to invert the flip-flop within the feed circuit. As a result, the median position is detected exactly.

Next, a timer circuit is explained. The timer circuit is important in terms of safety of the magnetic head-positioning device in accordance with the invention. As previously explained, in case of moving on track, current compulsorily flows to the voice coil motor until it reaches the median position between adjacent tracks in response to the feed circuit output. When the voice coil motor is mechanically stuck because of dust and so forth, there is a possibility that current flows continuously to the voice coil motor and the coil burns out. In order to remove this, a maximum time during which current can compulsorily flow to the coil by means of the feed circuit is set by the timer circuit. In a case of exceeding the above-mentioned maximum time, the feed circuit output automatically changes to the same condition as when the voice coil motor stops.

An actual example is illustrated in the timer circuit 1202 of FIG. 12. The circuit includes monostable multivibrators 1204, 1205, and what is called a re-triggerable one shot multivibrator 1202, for example, MC 14538 produced by Motorola, Inc.

The period of the monostable multivibrator 1204 is set longer than the step pulse rate. When the head is continuously moving on tracks, a narrow pulse, which is set with the period of the monostable multivibrator 1205, is outputted after the time which is set with a period of the re-triggerable one shot multivibrator 1204 from that the last step pulse. Then, the flip-flop of the feed circuit, which has not been inverted, failing to detect the median position between adjacent tracks, is inverted in response to the above-mentioned pulse. Even when moving on tracks in order, a pulse is outputted from the timer circuit. However, output of a pulse does not affect control of the voice coil motor at all due to the construction of the feed circuit as explained above.

Next, a capacitor short circuit is explained. In the conventional position control feedback loop, a compensating circuit, called a phase lag compensation, is put within the loop, and gain in the low frequency region is increased in order to minimize the stationary position error. However, when a large capacitor for phase lag compensation is used, the time required for controlling the voice coil sometimes becomes extremely longer by variation of the initial electric charge or other parameters of the capacitor, because of time delay in chargeand-discharge of the capacitor. In the capacitor short circuit in accordance with the present invention, the above-mentioned shortcomings, namely, that the period required for controlling the voice coil becomes extremely longer, are removed. In order to accomplish that, both terminals of the capacitor for phase lag compensation or a capacitor having a relatively large size, which is put within the position control feedback loop for other purposes, are short-circuited for a very short period at the time of reaching the target track position, and zero voltage on both terminals of the capacitor is obtained. Thus, effects of residual electric charge on the capacitor are removed.

An actual example of a capacitor short circuit is illustrated in FIG. 12. It is comprised of circuit 1203 and a short-circuit switch for capacitor shorting within the position sensor illustrated in FIG. 12. Change in output of position comparator 416 is differentiated and the capacitor is short-circuited for a short period to a certain degree wherein stability of the voice coil motor is not affected in the stationary state.

Figure 13A:
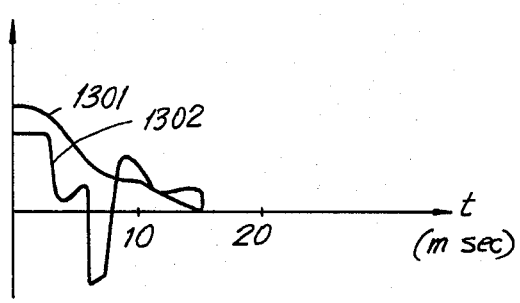
FIG. 13a illustrates experimental results of the effects on head displacement of a capacitor short circuit.
Figure 13B:
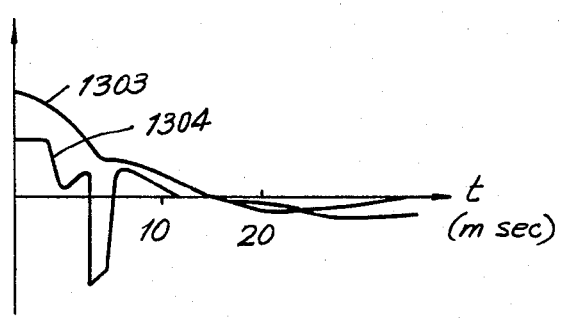
FIG. 13b illustrates the effect when not having the capacitor short circuit.

The effect of the capacitor short circuit is shown in FIG. 13, which shows results of experimentation. FIG. 13a shows performance with a circuit having the capacitor short circuit, and FIG. 13b shows performance in the circuit not having the capacitor short circuit. In both cases, the load is relatively heavy. Curves 1301 and 1303 show displacement of the voice coil motor, which is measured optically without contact. Curves 1302 and 1304, which are shown for reference, illustrate the voice coil motor driving waveforms, which correspond to FIG. 11g. In comparison of FIG. 13a with FIG. 13b, it is clear that control of position is greatly improved by the capacitor short circuit. As stated above, in the magnetic head-positioning device for magnetic disc drive in accordance with the invention, the capacitor short circuit has a large effect when the load on the voice coil motor is heavy.

Figure 14A:
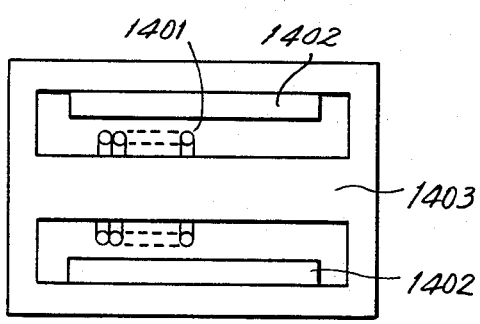
Figure 14B:
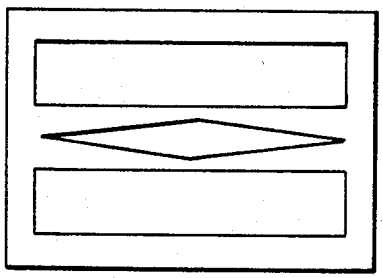
Figure 14C:
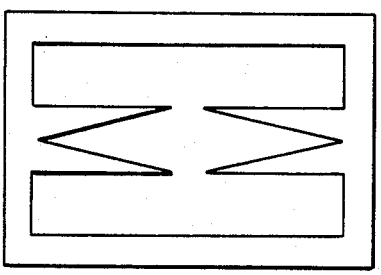
Figure 14D:
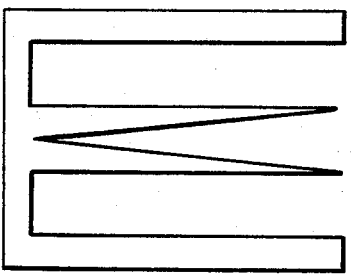

Next, the voice coil motor is explained. FIG. 14a shows a schematic view of the voice coil motor. A magnetic flux concentration is generated in the gap by a magnetic 1402 and magnetic circuit 1403. Force is generated by feeding current to a coil 1401. It is desired that the ratio L/R of inductance L and resistance R of the coil 1401 is small in order to speed up response of the voice coil motor. That is, it is desirable that inductance of the coil 1401 is reduced. In the voice coil motor in accordance with the invention, inductance is reduced by providing a cavity portion within the coil of the magnetic circuit and by reducing the volume of magnetic material within the coil as shown in FIGS. 14b, c, d, as examples. FIGS. 14b, c, d illustrate only the magnetic circuits. In FIGS. 14b, c, d, magnetic flux concentration within the magnetic circuit is equalized by providing a cavity or gap portion which is inversely proportional to the magnetic flux produced by the magnet in consideration of the flow of magnetic flux by magnet. Owing to this, only the inductance of the coil can be reduced without affecting the magnetic flux concentration in the gap.

As stated above, in the magnetic head-positioning device for magnetic disc drive in accordance with the invention, highly precise magnetic head-positioning and track-transferring are available by means of a very simple circuit construction. In particular, when applied to a floppy disc drive, a super-thin and less expensive floppy disc device is available and useful.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magnetic head-positioning device for a magnetic disc drive, comprising:
   a voice coil motor for transferring a magnetic head to a predetermined track position to stop there;
   a position sensor for detecting the track position and a median position between a track and an adjacent track;
   a feed circuit for transferring said magnetic head to an adjacent track position by accelerating said voice coil motor to said median position between said track and said adjacent track;
   a speed sensor for detecting the speed of said voice coil motor;
   a summing amplifier for summing outputs of said position sensor, said feed circuit and speed sensor; and
   means for driving said voice coil motor, said means for driving providing output driving signals in response to the output of said summing amplifier, said head-positioning device when driven being moved from one track to the next adjacent track.

2. A magnetic head-positioning device for magnetic disc drive as claimed in claim 1, wherein said position sensor comprises one luminescent element, a detecting plate with slits, said plate and said luminescent element moving relative to each other, two light receiving elements for receiving the light whose brightness is varied by passing through said relatively moving detecting plate with slits, and an amplifier for amplifying the difference between outputs of said two light receiving elements.

3. A magnetic head-positioning device for magnetic disc drive as claimed in claim 1, wherein a position controlling feedback loop acts for transferring and stopping said voice coil motor at the track position nearest to said median position between said track and said adjacent track.

4. A magnetic head-positioning device for magnetic disc drive as claimed in claim 1 or 2, wherein the position sensor output is alternately and repeatedly increased and decreased with respect to change of position of said motor in the same direction, track position and the median position between adjacent tracks being distinguished by the direction of said output being increased or decreased.

5. A magnetic head-positioning device for magnetic disc drive as claimed in claim 1, wherein said feed circuit includes a flip-flop with set-reset capability, said flip-flop being set or reset in response to step signals triggering motion of said positioning device, and the outlets of said flip-flop being inverted in response to a change of the position sensor output indicating that said voice coil motor has reached the median position between adjacent tracks.

6. A magnetic head-positioning device for magnetic disc drive as claimed in claim 1, wherein said voice coil motor is moved from said track to said adjacent track by relatively weighting the inputs to said summing amplifier, said feed circuit output having the largest weight.

7. A magnetic head-positioning device for magnetic disc drive as claimed in claim 3, wherein said feed circuit includes a flip-flop with set-reset capability, said flip-flop being set or reset in response to step signals triggering motion of said positioning device, and the outlets of said flip-flop being inverted in response to a change of the position sensor output indicating that voice coil motor has reached the median position between adjacent tracks.

8. A magnetic head-positioning device for magnetic disc drive as claimed in claim 1, wherein said means for driving said motor includes a power amplifier for amplifying the output of said summing amplifier, said amplifier output being applied to said voice coil motor and further comprising a speed feedback loop for decelerating the voice coil motor, which is accelerated to the median position between adjacent tracks by the feed circuit, to zero speed while being transferred from the median position between adjacent tracks to the next median position between adjacent tracks in the moving direction; said feedback loop including said speed sensor, summing amplifier, power amplifier and voice coil motor.

9. A magnetic head-positioning device for magnetic disc drive as claimed in claim 1, having a summing amplifier for weighted-summing of said respective outputs of said feed circuit, position sensor and speed sensor, wherein the weights of the feed circuit output and of the speed sensor output are set such that a voltage is applied to the voice coil motor until the voltage of the amplifier output is saturated in the initial stage of accelerating the voice coil motor, and a voltage for moving the voice coil motor at constant speed is applied to the voice coil motor before reaching the neighborhood of said median position of adjacent tracks.

10. A magnetic head-positioning device for magnetic disc drive as claimed in claim 1, and further comprising a timer circuit for determining a maximum time of accelerating the voice coil motor.

11. A magnetic head-positioning device for magnetic disc drive as claimed in claim 1, and further comprising a median position detector for detecting that the magnetic head passes through the median position between adjacent tracks, said median position detector operating on the position sensor output and the speed sensor output.

12. A magnetic head-positioning device for magnetic disc drive as claimed in claim 8, and further comprising a position feedback loop and a capacitor short circuit for shorting both terminals of capacitor within said position feedback loop, said loop including said position sensor, summing amplifier, power amplifier and voice coil motor, said shorting being for a predetermined time when the magnetic head reaches the track position when the magnetic head is transferred on tracks, said short circuit preventing hunting of said head.

13. A magnetic head-positioning device for magnetic disc drive as claimed in claim 1 or 2, wherein said position sensor includes a movable metallic plate and a stable plate, said movable metallic plate having slits in two rows, whose pitches are shifted by half in the moving direction of said movable metallic plate, the slits at the end being larger than the other of said slits, said metallic plate being put between one luminescent element and two receiving elements, the brightness of the light emitted from said luminescent element being controlled through said slits of said metallic plate, and said stable plate having smaller slits than those of said metallic plate, said stable plate being put between one of said luminescent element and said metallic plate, and said metallic plate and said receiving elements.

14. A magnetic head-positioning device for magnetic disc drive as claimed in claim 2, and further comprising a standard track detector for optically detecting a standard track of a magnetic disc drive by the brightness of said light from said luminescent element, said detecting plate for changing the brightness of the light emitted from said luminescent element being united in a body with said standard detector.

15. A magnetic head-positioning device for magnetic disc drive as claimed in claim 13, and further comprising a standard track detector for optically detecting a standard track of a magnetic disc drive by the brightness of said light from said luminescent element, said detecting plate for changing the brightness of the light emitted from said luminescent element being united in a body with said standard detector.

16. A magnetic head-positioning device for magnetic disc drive as claimed in claim 1, wherein said voice coil motor, for generating a force by feeding a current to a movable coil within a magnetic field, has a reduced inductance in said movable coil, said coil having a hollow portion in the magnetic circuit within the movable coil to reduce said inductance.

17. A magnetic head-positioning device for magnetic disc drive as claimed in claim 1, wherein said voice coil motor generates a force by feeding a current to a movable coil within a magnetic field and said speed sensor outputs a voltage proportional to the speed generated in said movable coil within said magnetic field, the sectional area of the magnetic circuit positioned within said movable coil being larger at both ends of the moving range of said movable coil, said speed sensor being sensitive to magnetic flux concentration and having uniform sensitivity within the moving range of said movable coil, said flux concentration being made uniform by said enlarged sectional areas of said magnetic circuit, said enlargement being in the direction transverse to the motion of said movable coil.

* * * * *